March 29, 1966  T. K. KJELLMAN ETAL  3,243,548
CONSTANT ACTUATING FORCE CONTROL SWITCH
WITH CONTACT WELD BREAKING MEANS
Filed June 7, 1961  4 Sheets-Sheet 1

THOMAS K. KJELLMAN
FRANK O. WATSON
INVENTORS

BY Killman, Smith & Lamb
ATTORNEYS

THOMAS K. KJELLMAN
FRANK O. WATSON
INVENTORS

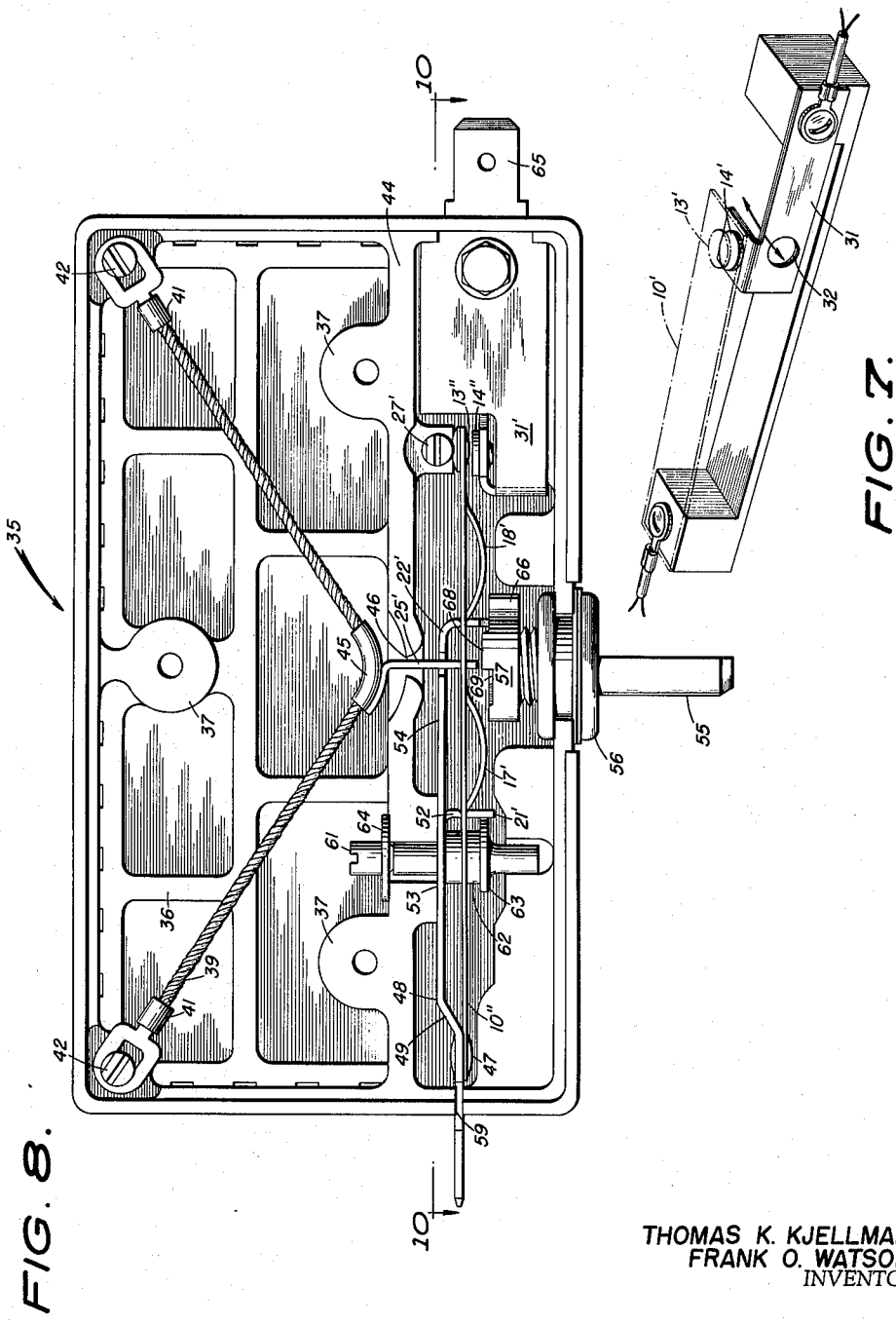

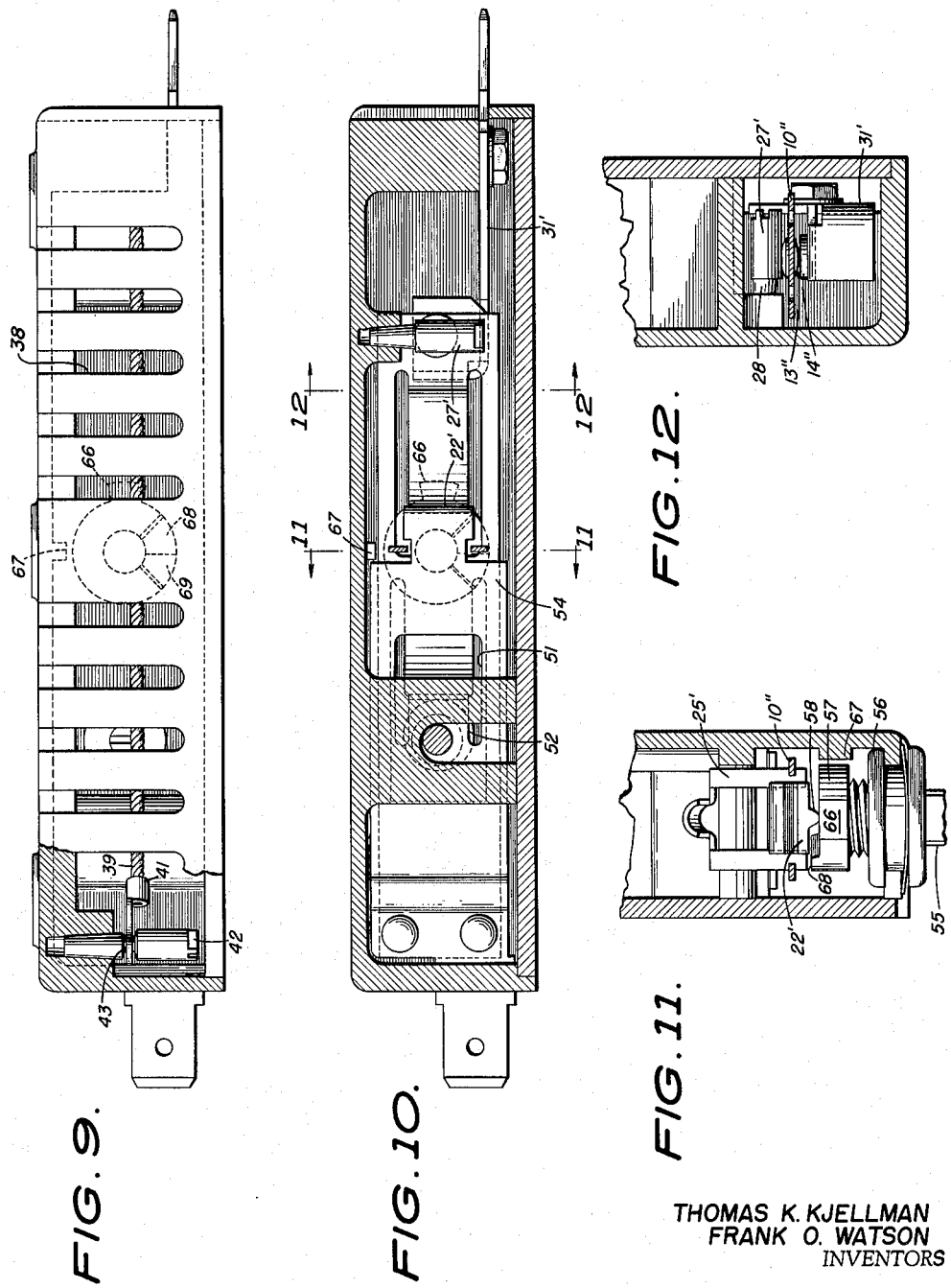

United States Patent Office 3,243,548
Patented Mar. 29, 1966

3,243,548
CONSTANT ACTUATING FORCE CONTROL SWITCH WITH CONTACT WELD BREAKING MEANS
Thomas K. Kjellman, Timonium, and Frank O. Watson, Baltimore, Md., assignors to The Bendix Corporation, Baltimore, Md., a corporation of Delaware
Filed June 7, 1961, Ser. No. 115,401
13 Claims. (Cl. 200—113)

The present invention relates to electrical switches. More particularly it relates to a switch especially suited for use in automatic electrical control devices.

Commonly, condition responsive controls for heating and air conditioning systems rely on the displacement of a sensing element to trigger a switch from an "off" to an "on" position or vice versa. A thermostat, for example, may employ the differential expansion of a bimetallic strip to sense temperature changes, while a humidistat may utilize the hygroscopic changes in length of human hair. If the control device is to be sensitive, free from hysteresis or excessive dead space and maintain calibration through many operating cycles, it is desirable that the force required for its actuation be small and preferably independent of the displacement of the sensing element. As switch operating forces and force gradients are reduced to approach these requirements the switch contact pressure is also reduced with the result that the power handling capability of the switch is curtailed. Moreover, contact break velocity is reduced which greatly increases the probability of arcing at the contacts. As a result of arcing, occasional welds occur and because of the feeble tension imposed upon the contacts, the circuit remains closed when conditions require that it be open. Hence, either the reduced power rating of the switch necessitates the employment of a low voltage, low amperage circuit wherein the primary controller consists of an electromagnetic relay or else the mass of the sensing material must be increased to provide more available operating energy and thus permit the restoration of switch contact pressure. The first of these expedients is generally disadvantageous because of the added expense of the relays and transformers involved, while the second expedient materially reduces the sensitivity of the control.

One object of the present invention therefore is to provide a switch capable of being operated by an element which signals changes in its environment by producing a displacement.

An additional object is to provide a switch operated by the displacement of a sensing element and in which the reaction force presented by the switch to the sensing element is substantially independent of the displacement of the element.

Another object is to provide a switch requiring only moderate operating force thus permitting its operation by sensing elements of reduced mass and increased sensitivity.

A further object of the invention is to provide a switch having reduced operating force requirements and which nevertheless imparts a high velocity to the movable switch contact when the circuit is broken.

Still another object is to provide a switch having means for applying shear forces to the contacts in order to break contact welds.

Yet another object is to provide a switch operable by the displacement of a sensing element and which includes means for manually adjusting the trip point of the switch thereby permitting the switch to respond at any desired condition.

Still a further object is to provide a switch combining features of the foregoing objects with manual means for moving the switch into circuit make or break position independently of displacement of the sensing element.

Other objects and advantages will become apparent as an understanding of the invention is gained through study of the following detailed description and the accompanying drawings.

Briefly, the present invention contemplates a switch in which the usual spring operating force, having a slope or gradient arbitrarily defined as positive, is opposed by a force having a negative gradient. It is desirable generally that the negative force gradient means provide initially a positive force output, zero force at some point in the operation of the switch and as switch movement continues, a negative force output. The resultant of the combination of the output of the negative force gradient means with the positive gradient switch forces provides a switch which may be displaced from one contact position to another with the application of substantially constant force.

While the foregoing is somewhat abstruse, it will be better understood when it is considered that the forces having a negative gradient may be obtained by adding a second toggle acting spring to a switch operated by a first toggle acting spring. The over-center position of the second toggle will generally be different from the overcenter position of the first toggle. As will later be graphically demonstrated, such construction permits wide range in the choice of operating force and force gradients and vastly improves accuracy when used in a control device.

As a means for increasing the ability of the switch to handle heavy loads, the invention includes contacts supported on a bimetallic cantilever. The heating attending contact arcing and current flow through the contacts warps the bimetal which in turn provides shear forces for rupturing contact welds.

Finally, a practical embodiment of the invention will be shown in which the switch may serve to control humidity or temperature, depending upon the sensing element employed.

In the drawings:

FIG. 7 is a perspective showing means provided by the invention for breaking contact welds;

FIG. 8 is a front elevation of a humidistat embodying the principles of the invention in practical form;

FIG. 9 is a top view of the humidistat of FIG. 8 with portions thereof broken away to reveal the means for anchoring the sensing element;

FIG. 10 is a section taken along the line 10—10 of FIG. 8;

FIG. 11 is a section taken along the line 11—11 of FIG. 10; and

FIG. 12 is a section taken along the line 12—12 of FIG. 10.

Figure 1:
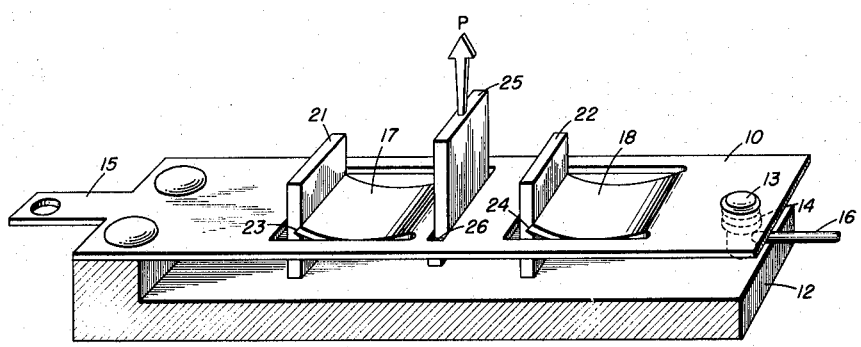
FIG. 1 is a perspective of a switch embodying certain elements of the invention.

FIG. 1 illustrates the invention in rudimentary form. A switch blade 10 of beryllium-copper or other suitable spring material is attached at one end to a rigid insulating base 12. An electrical contact 13 is secured to the free end of blade 10 in position to engage a contact 14 on base 12. External electrical connections to the switch are established through conductors 15 and 16. A pair of flexible tongues 17 and 18 are excised from blade 10. Rigid abutments 21 and 22 extend from the base 12 and are provided with pivot grooves 23 and 24 acting as bearings for the free ends of tongues 17 and 18, abutments 21 and 22 are closer than the tongue length to the attached ends of tongues 17 and 18 so that it is necessary to bow the tongues in order to bring their free ends to bear in the grooves 23 and 24. This provides compressive forces acting upon blade 10 at the points of attachment of the tongues to the blade. As will later be seen, the lines of action of these forces intersect the plane of the blade at acute angles when the switch is in stable equilibrium and because of the flexibility of the joints between the tongues and the blade, a toggle action is provided. External operating force is applied to the switch by a T-shaped link 25 extending upwardly through a slot 26 in blade 10. The operating force represented by the vector P, may be supplied by a hygroscopic or thermosensitive element depending upon the external condition to be controlled.

FIGS. 2–5 schematically illustrate the principles of operation of the invention. The vector diagrams accompanying these figures qualitatively represent the forces involved since the effect of moments has not been taken into account. It will be assumed that the force outputs of tongues 17 and 18 are solely compressions acting along lines extending between their respective pivot centers 23 and 24 and their points of attachment to blade 10. It is further assumed that the compression of tongues 17 and 18 does not vary with their deflection during operation of the switch. Several complicating factors have been ignored but the omissions do not alter the validity of the explanation.

Figure 2:
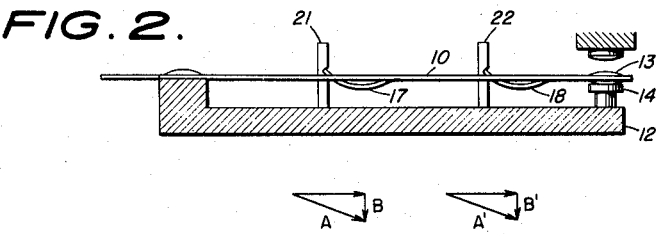
FIGS. 2–5 are schematics useful in explaining the operation of the invention.

In FIG. 2 the switch is shown in a normally closed position. Blade 10 is undeflected. The spring forces of tongues 17 and 18 are represented by the vectors A and A', respectively, each of which possesses components B and B' acting vertically downward. Neglecting moments, the sum of components B and B' represents the force holding contact 13 in engagement with contact 14.

Figure 3:
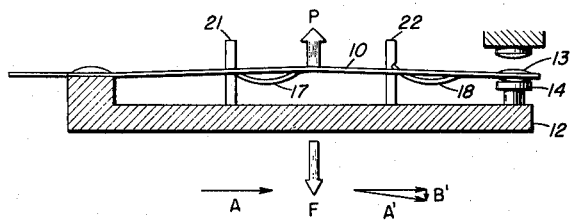

In FIG. 3 an upward force P has deflected blade 10 to the point where the blade passes through center 23 of tongue 17. In this position there will be no component of force from tongue 17 acting transversely to blade 10. Horizontal vector A, possessing no vertical component, aptly illustrates the force of tongue 17. Blade 10, however, is still below center 24 so that the force A' of tongue 18 possesses a component B' directed downward and holding contact 13 against contact 14. The vector F represents the force necessary to deflect blade 10, so that the applied force P must equal the sum of F and B'.

Figure 4:
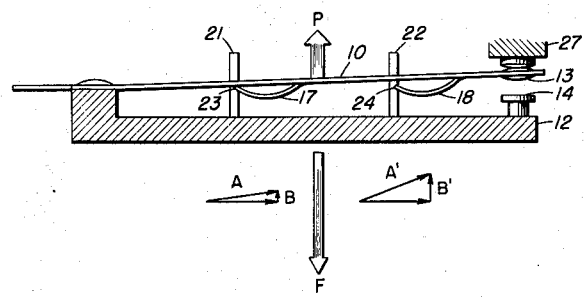

FIG. 4 illustrates the continued deflection of blade 10 by the force P to the point where the blade has crossed both centers 23 and 24. Tongues 17 and 18 now produce upwardly acting components B and B'. The restoring force F of blade 10 has increased substantially over that of FIG. 3 due to the greater deflection of the blade. A force equalling the sum of components B and B' opposes force F, however, so that the magnitude of force P is unchanged from that of FIG. 3. Contact 13 has shifted from engagement with contact 14 thus opening the circuit controlled by the switch. A stop 27 limits the upward travel of blade 10. Preferably, the spacing between stop 27 and contact 14 is adjustable, thus providing a means for setting the differential response of the control as may be desired.

Figure 5:
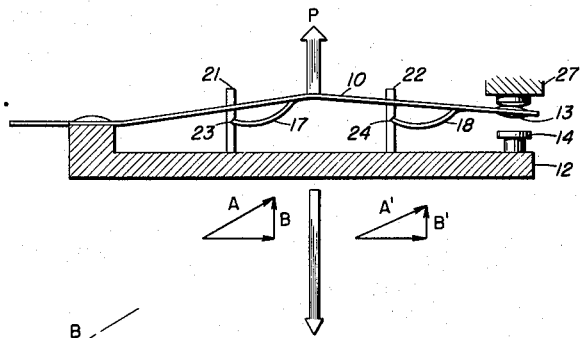

FIG. 5 illustrates a still greater deflection of blade 10. Forces A and A' have been rotated to a more nearly vertical position thereby increasing the magnitude of components B and B'. Combining the still greater restoring force F with the enlarged forces B and B' results in substantially no change in the magnitude of force P.

Figure 6:
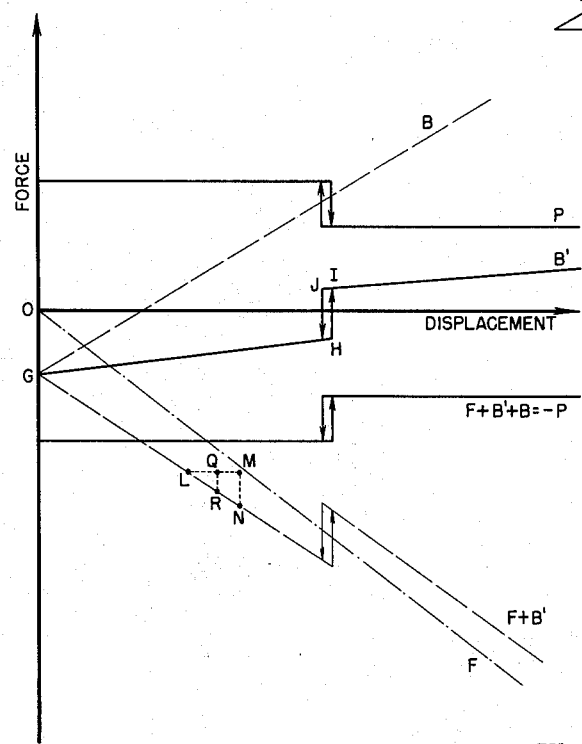
FIG. 6 is a chart showing the manner by which the invention combines various forces to provide a control having a substantially constant operating force.

The vector relationships of FIGS. 2–5 are more fully comprehended in the chart of FIG. 6. Upward forces acting on blade 10 are plotted along the positive ordinate axis, downward forces are plotted along the negative ordinate axis and upward displacement of the blade at the point of application for force P is plotted along the positive abscissa axis. The spring forces acting on the blade are F, and the components B and B' produced by tongues 17 and 18. Blade 10 is considered to be undeformed initially and to possess liner spring characteristics. Therefore, force F is represented by a straight line passing through the origin. The slope of line F depends upon the stiffness of blade 10. Although it is convenient to consider force F as having an initial value of zero, it will be appreciated that such is not necessarily the case. Force B' possesses an initial downward value of magnitude OG responsible for holding the switch conacts in engagement. So long as the switch contacts are closed, the blade 10 can be regarded as a beam fixed at both ends. B' varies but little until the blade is deflected to a position above center 24 of FIG. 1. B' then abruptly changes its direction from a downward force to an upward force throwing the switch contacts out of engagement. This action is represented by the discontinuous point H on the line B'. At H, the free end of blade 10 moves against stop 27 where the blade may again be regarded as fixed at both end. The point P will be displaced only by a negligible amount, hence the vertical line HI fairly represents the change in B'. For continued upward displacement of the blade beyond the point I, B' varies at the same rate as from G to H. When the displacement is reduced from a value greater than that at point I to some lesser value, B' exhibits a hysteresis effect. It is therefore necessary to relax the blade to the point J before B' reverses its direction to cause the closure of the switch contacts. The hysteresis effect, often referred to as the control differential, varies largely in accordance with the spacing between stop 27 and contact 14. It may be reduced to a small value by proper design, but obviously it cannot be eliminated entirely from an "on-off" control. Further, a certain amount of differential is desirable in order that the controlled system will be stable.

The forces involved in a conventional control appear in FIG. 6 as the line $F+B'$. Consider a control having the operating force characteristic represented by the line $F+B'$ and having a temperature or humidity responsive sensing element to signal environmental conditions by changes in length. Initially, the sensing element might possess a length corresponding to the point L on line $F+B'$. For some arbitrary change in conditions, the sensing element under constant load would increase its length to correspond to the point M. However, this change in length is resisted by the increase in force $F+B'$ represented by the line MN. The sensing element cannot move to its desired position but must settle at some intermediate point, say Q, where the force difference QR is equal to the force required to compress the element by an amount MQ. Such a situation is tolerable provided that throughout the operating range of $F+B'$ both the elastic properties of the sensing element and its response to conditions are linear. Quite obviously though, the sensitivity of the control is reduced, for the greater the slope of $F+B'$, the closer the point Q approaches the point L. Furthermore, the possibility exists that the control may be subjected to extreme conditions causing the elastic limits of the sensing element to be exceeded, thus permanently throwing the control out of calibration.

These disadvantages of prior control switches are eliminated in the present invention by the provision of force B which possesses a slope opposite to that of force F. It can be seen that the addition of B to $F+B'$ produces a force-displacement characteristic which is substantially constant throughout the operating range of the control. Thus sensitivity is restored to the control because of the constant load imposed on the sensing element.

The slope of line B and its intercepts are readily variable in order to compensate for any particular $F+B'$ function. The slope of B is a function of the compression of tongue 17 of FIG. 1, shown in FIGS. 2–5 as the vector A. The point at which B intercepts the displacement axis is a function of the geometry of the switch. It may be determined by the elevation of center 23 relative to center 24 or an equivalent effect may be obtained by forming a permanently set angle into the base of tongue 17. Similarly, the stiffness of blade 10, its length, the length of tongues 17 and 18 and the points at which they are attached to the blade are matters of choice in which wide latitude may be exercised in order to achieve a particular operating characteristic while still maintaining the advantages of the invention.

FIG. 7 illustrates the means provided by the invention for rupturing contact welds. Contact welds can occur either upon circuit make or just prior to circuit break. The welds occurring on circuit make result from fairly rapid contact bouncing which is ordinarily undetectable and of short duration. Welds occurring on circuit make are innocuous until, of course, it is desired to break the circuit. Although such welds are not of great strength, the limited amount of force available in a control switch may not be sufficient to force the contacts apart and the control fails. The welds occurring on circuit break are the result of the rise in resistance and attendant heating of the contacts which accompanies diminishing contact pressure as the switch trip point is approached. The latter type weld is equally capable of causing failure of the switch used in a control function.

According to the invention, means are provided for producing shear forces capable of rupturing welds of any strength likely to be encountered in practice. A switch blade 10' is arranged to move a contact 13' into engagement with a contact 14' under the influence of any suitable operating force. Contact 14' is mounted on a thermally responsive bimetallic cantilever arm 31. When heated, arm 31 warps causing contact 14' to move in a plane perpendicular to the plane of motion of contact 13'. The resistance of arm 31 is preferably sufficient to cause a moderate amount of self-heating during normal current flow. The self heat should not cause a temperature rise likely to damage the contacts or other adjacent elements of the switch. By making the arm 31 comparatively massive, adequate force can be developed for temperature rises well within acceptable limits. Also the arm can be designed to generate local hot spots which are removed from elements likely to be damaged by the heat and which will still produce the desired shear motion. For example, a hole 32 in arm 31 increases the resistance of the arm in its vicinity and creates a localized temperature increase. Alternatively, the metal of the arm may be reduced in width or thickness at other selected points along its length.

The heating due to contact faulting at circuit make is of such short duration that only a fragile, low mass arm could respond with any appreciable motion, but then only weak shear forces would be available. With self-heating, however, circuit make welds are readily broken.

The upper surface of contact 14' is preferably flat so that the transverse motion of arm 31 does not change the distance movable contact 13' must travel in order to close the circuit. Thus the weld rupturing means do not alter the calibration or sensitivity of the switch when used in control applications. Because these means are also useful in switches intended for other applications, the form of blade 10' may be altered at will and the switch operating forces may be derived from sources other than sensing elements. For example, an electromagnet or a manually operated mechanism can be employed to operate blade 10' or its equivalent.

FIGS. 8 and 12 disclose a control device in the form of a humidistat embodying the foregoing features in practical form. The substantial reduction in operating force, the maintenance of switching capability, the increased accuracy and stabilization of calibration afforded by the invention all combine to enable the production of a control instrument of reduced size, weight, and costs of construction and of increased reliability.

Referring particularly to FIG. 8, a shallow rectangular housing 35 is molded from an electrically insulating plastic material. Reinforcing webs 36 and bosses 37 for receiving mounting screws are formed integrally with the housing. Vent slots 38, best seen in FIG. 9 admit air to that portion of the housing containing the hygroscopic sensing element 39. The sensing element 39 is formed by crimping a pair of closed end lugs 41 on the ends of a twisted hank of human hair. Element 39 is suspended between a pair of taper pins 42. As best seen in FIG. 9, each of the pins 42 possesses an eccentric groove 43 which provides one means for adjusting the effective hair length during factory calibration of the instrument.

Again referring to FIG. 8, a rib 44 partitions housing 35 into an upper vented compartment containing the sensing element and a lower closed compartment containing the switch elements. A saddle 45 having an integrally formed connecting link 25' is placed astride sensing element 39. The link 25' depends through a slot 46 in rib 44 to communicate changes in length of the sensing element to the switch. The switch elements corresponding to the schematic of FIG. 1 will now be described with reference to FIGS. 8 and 10.

A thin flexible switch blade 10" is secured by rivets 47 to a semiflexible spring leaf 48. A vertical bend 49 is made in leaf 48 to provide clearance for the movement of blade 10". As best seen in FIG. 10, a U-shaped slot 51 punched in leaf 48 provides a tongue 52, the free end of which is bent downward to form an abutment 21' equivalent to abutment 21 of FIG. 1. The free end 54 of leaf 48 is reduced in width and bent downward to form a second abutment 22' corresponding to abutment 22 of FIG. 1.

An adjusting shaft 55 projects from the housing 35 to permit manual selection of the operating point of the control. The upper end of shaft 55 is threaded into a bushing 56 and terminates in a disk head 57. Referring to FIG. 11, the lower end of abutment 22' is brought to a friction reducing triangular point 58 which bears against the upper surface of shaft head 57. Leaf 48 carrying its attached blade 10" is pressed into a closely fitting slot 59 in housing 35 where it is held in position by the pressure of the upper surface of the leaf acting against a projecting portion 61 of rib 44. An adjusting pin 61 shaped with a shoulder 62 and an eccentric flange 63 passes upward through tongue 52 where it is retained with the upper surface of the shoulder bearing against the lower surface of the tongue by a slotted spring clip 64. The eccentricity of flange 63 permits factory adjustment of the compression of tongue 17' by displacing abutment 21' horizontally a selected amount with only a negligible amount of vertical displacement.

The free end of blade 10" carries an electrical contact 13" arranged to move into circuit make position with a fixed contact 14". As seen in FIGS. 8 and 12, contact 14" is mounted on a bimetallic cantilever 31' which provides the weld breaking action previously described with reference to FIG. 7. A tab 65 on cantilever 31' projects from housing 35 for connecting an external circuit to the control.

Shaft head 57, as best seen in outline in FIG. 10, is provided with a radially projecting stop 66 which strikes a projection 67 on the rear of housing 35 thus limiting motion of shaft 55 to less than one revolution. When shaft 55 is rotated clockwise, a vertical projection 68 (FIG. 11) on the surface of head 57 is brought beneath the tip 58 of abutment 22'. This elevates the center about which tongue 18' rotates well above the elevation produced by one clockwise revolution of shaft 55. The sensing element cannot contract sufficiently to raise blade 10" above the elevated center and consequently contacts 13" and 14" will move into and remain in positive engagement irrespective of the humidity to which the sensing element may be subjected.

Upon counterclockwise rotation of shaft 55, abutment tip 58 drops into a depression 69 (FIG. 8) just prior to the limit of shaft rotaiton. This lowers the toggle center of tongue 18' below the level which blade 10" assumes when relieved of all external force and consequently contact 13" moves against stop 27'. Since no variation in length of element 39, either extension or contraction, can cause contact 13" to move off stop 27', a positive "off" position is provided. Intermediately of the positive "off" and "on" positions, shaft 55 positions abutment 22' at a level corresponding to a selected relative humidity operating point. If the relative humidity is in excess of that selected, element 39 lengthens and permits the switch to move to a closed position. If the relative humidity is less than the selected percentage, the sensing element shortens to the extent that the switch cannot close. I should be noted that both the positive "on" and positive "off" positions are provided without utilizing the sensing element as a connecting link. Hence, the switch can be used as a manual control even if element 39 should break.

FIG. 12 illustrates the means provided for the factory adjustment of the control differential. Stop 27' possesses a tapered shank 28 which is eccentric to the exposed body portion. Rotation of stop 27' thus varies the permissible travel of the free end of blade 10" in moving from a closed circuit to an open circuit position and vice versa. The control differential is predominantly a function of the blade travel distance, since the constant load imposed on the sensing element virtually eliminates hysteresis of the sensing element as a factor. Thus the control may be relied upon to maintain factory calibration for longer periods than could be hoped to be attained in prior designs.

The principles of the invention have been demonstrated to possess general utility beyond the specifically described embodiment. Many variations and substitutions may be made in the light of the above teachings. For example, a thermally responsive element or a pressure responsive element may be readily substituted for the hygroscopic element described. Alternatively, the switch may be actuated by electromagnetic or pneumatic means. It should therefore be understood that the invention is limited solely by the scope of the following claims.

The invention claimed is:

1. In a switch having a base and a movable contact arm supported by said base for pivotal motion in a first plane, a contact engageable by said arm, and a bimetallic element on said base supporting said contact and electrically connected thereto for conducting current upon engagement of said contact by said arm, said element responding to current flow to produce motion of said contact in a plane perpendicular to said first plane.

2. In an electrical switch, a first contact arm moveable in a vertical plane, a second contact arm moveable in a horizontal plane, means for moving said first arm into and out of engagement with said second arm to make and break an electrical circuit therethrough, and thermally responsive means for moving said second arm transversely to said first arm for rupturing welds between said contact arms.

3. In an electrical switch, a base, a first movable contact arm flexibly supported by said base, a second flexible contact arm supported by said base, means for moving said first arm into and out of engagement with said second arm to make and break an electrical circuit through said arms, and thermally responsive means for moving said second arm in a plane of motion transverse to the plane of motion of said first arm whereby current induced adhesions between said arms are ruptured.

4. A switch as claimed in claim 3 wherein and said means for moving said first arm includes a condition responsive sensing element.

5. A control switch comprising a base, a contact arm flexibly supported by said base for motion in a plane perpendicular thereto, an abutment supported by said base within the plane of motion of said arm, a toggle spring acting against said arm and reacting against said abutment, means for adjusting said abutment with respect to said arm, a cantilever supported by said base for flexure in a plane parallel thereto, a contact mounted on said cantilever engageable with said arm, and thermally responsive means for flexing said cantilever perpendicular to the motion of said contact arm such that current induced contact welds between said arm and said contact are broken.

6. A control switch comprising a base, a flexible contact arm movable in a first plane, a pair of abutments extending generally perpendicularly from said base and traversed by said contact arm, a pair of toggle springs acting upon said arm and reacting against said abutments, a bimetallic member supported by said base and responsive to heat to deflect in a direction perpendicular to the plane of motion of said arm, and a contact supported by said member in a position to engage said arm.

7. A switch as claimed in claim 6 wherein said bimetallic member is composed of electrical resistance material to provide resistance sufficient to heat said member upon passage of current therethrough.

8. A control switch comprising a housing, a flexible contact arm having a pair of longitudinally spaced resilient tongues, a pair of abutments against which the free ends of said tongues bear, means for adjusting one of said abutments in a direction perpendicular to said arm, means for adjusting the other of said abutments in a direction parallel to said arm, a displacement producing sensing element linked to said arm, and a thermally responsive contact engageable by said arm and movable transversely to said arm in response to current flow therethrough.

9. A control switch comprising a base, a resilient contact arm including a pair of generally U-shaped apertures therein defining a pair of flexible tongues, a pair of abutments extending from said base each through one of said apertures, each of said abutments including a pivot against which the free end of an adjacent tongue bears, means for adjusting the spacing of the pivot of one of said abutments from said arm, a condition responsive sensing element adapted to displace said arm relative to the pivots of said abutments, a contact engageable by said contact arm, and thermally responsive means on said base for supporting said contact.

10. A switch as claimed in claim 9 wherein said adjusting means includes a screw journalled in said base and bearing against said one abutment for varying the elevation of said pivot means from said base.

11. A switch as claimed in claim 10 with additional means for limiting the rotation of said screw and means actuated at the extremity of screw rotation for causing a variation in elevation of said one abutment exceeding the pitch of said screw.

12. A humidistat comprising a housing, a flexible contact arm supported at one end in said housing and having a pair of longitudinally spaced apertures therein defining a pair of resilient tongues, a second arm spaced from said contact arm and extending generally parallel therewith, a pair of abutments extending from said second arm through said apertures of said contact arm, the free ends of said tongues bearing against said abutments, an adjusting screw threaded in said housing and bearing against one of said abutments, a length of hygroscopic material supported in said housing collaterally with said contact arm, a link connecting said material to said arm, a bimetallic cantilever supported in said housing adjacent the free end of said contact arm, a contact on said cantilever engageable by said contact arm, and an adjustable stop for limiting the travel of said arm away from said contact.

13. A control switch comprising,
   a base,
   a contact on said base,
   a resilient contact arm fixed at one end to said base and extending generally parallel therewith, the free end of said arm being moveable between positions to make and break circuit with said contact,
first spring means continuously biasing said arm toward one of said circuit positions,
a first abutment supported by said base within the plane of motion of said arm,
second spring means acting upon said arm and reacting against said first abutment at a point thereon elevated from said base and traversed by said arm, said second spring means applying a force of said arm initially aiding the bias force of said arm and then opposing said bias force as said arm moves in the direction away from said one circuit position and beyond the point on said first abutment against which said second spring means reacts,
a second abutment supported by said base within the plane of motion of said arm;
third spring means acting upon said arm and reacting against said second abutment at a point thereon elevated from said base and traversed by said arm for propelling the free end of said arm from said one circuit position to the other; and
means applying a substantially constant actuating force to said arm, said actuating force opposing said bias force of said arm.

References Cited by the Examiner
UNITED STATES PATENTS

| | | | |
|---|---|---|---|
| 1,957,516 | 5/1934 | Williams | 200—67 |
| 2,246,581 | 6/1941 | Fetter | 200—67 |
| 2,429,813 | 10/1947 | Hausler | 200—67 |
| 2,508,040 | 5/1950 | Ransome | 200—67 |
| 2,565,790 | 8/1951 | Van Ryan et al. | 200—67 |
| 2,667,612 | 1/1954 | Lucas | 200—113 X |
| 2,820,870 | 1/1958 | Moksu | 200—138.6 |

FOREIGN PATENTS 721,435   1/1955   Great Britain.

BERNARD A. GILHEANY, *Primary Examiner.*

P. XIARHOS, L. A. WRIGHT, *Assistant Examiners.*